United States Patent
Matsuo et al.

(10) Patent No.: US 9,234,584 B2
(45) Date of Patent: Jan. 12, 2016

(54) CONTROL DEVICE OF AUTOMATIC TRANSMISSION

(75) Inventors: Katsuhiro Matsuo, Isehara (JP); Keizo Ishida, Hiratsuka (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 352 days.

(21) Appl. No.: 13/819,161

(22) PCT Filed: Aug. 3, 2011

(86) PCT No.: PCT/JP2011/067729
§ 371 (c)(1),
(2), (4) Date: Feb. 26, 2013

(87) PCT Pub. No.: WO2012/029490
PCT Pub. Date: Mar. 8, 2012

(65) Prior Publication Data
US 2013/0152718 A1      Jun. 20, 2013

(30) Foreign Application Priority Data
Aug. 31, 2010   (JP) ................. 2010-193254

(51) Int. Cl.
| | |
|---|---|
| F16H 61/00 | (2006.01) |
| F16H 61/68 | (2006.01) |
| F16H 61/16 | (2006.01) |
| F16H 59/02 | (2006.01) |
| F16H 59/00 | (2006.01) |
| F16H 61/02 | (2006.01) |

(52) U.S. Cl.
CPC ............. *F16H 61/68* (2013.01); *F16H 61/16* (2013.01); *F16H 59/0204* (2013.01); *F16H 2059/006* (2013.01); *F16H 2059/0239* (2013.01); *F16H 2061/0244* (2013.01); *Y10T 74/1926* (2015.01)

(58) Field of Classification Search
CPC ................... F16H 2061/0244; F16H 61/0248; F16H 59/0204; F16H 2059/0239; F16H 2059/006; Y10T 74/19251; Y10T 74/2003
See application file for complete search history.

(56) References Cited

U.S. PATENT DOCUMENTS

| | | | | |
|---|---|---|---|---|
| 5,946,976 | A | * 9/1999 | Miyoshi ................ | B60K 20/02 74/473.18 |
| 5,984,828 | A | * 11/1999 | Huber ................ | F16H 61/0213 477/142 |

(Continued)

FOREIGN PATENT DOCUMENTS

| | | |
|---|---|---|
| JP | 07-083327 A | 3/1995 |
| JP | 10-054454 A | 2/1998 |
| JP | 11-078617 A | 3/1999 |

(Continued)

*Primary Examiner* — William C Joyce
(74) *Attorney, Agent, or Firm* — Foley & Lardner LLP

(57) ABSTRACT

An automatic transmission has an automatic shift mode and a manual shift mode. When an opposite manual operation is performed, during an automatic shift based on a shift map in the automatic shift mode, in an opposite direction opposite to the automatic shift or when the opposite manual operation is performed, during a forced shift performed regardless of the manual operation in the manual shift mode, in the opposite direction opposite to the forced shift, a control apparatus forbids a shift based on a first manual operation and permits a shift based on a second or subsequent manual operation in the opposite direction opposite to the automatic shift or the forced shift.

6 Claims, 4 Drawing Sheets

(56) References Cited

U.S. PATENT DOCUMENTS

2010/0100290 A1* 4/2010 Sauter .................. B60W 10/02
 701/52
2012/0004818 A1* 1/2012 Wakita et al. .................. 701/66

FOREIGN PATENT DOCUMENTS

| JP | 2003-083444 A | 3/2003 |
| JP | 2007-315414 A | 12/2007 |

* cited by examiner

CONTROL DEVICE OF AUTOMATIC TRANSMISSION

TECHNICAL FIELD

The present invention relates to a control device or control apparatus for an automatic transmission having a function of enabling a shift command resulting from a manual operation.

BACKGROUND ART

Many automatic transmissions for vehicles have a manual transmission mode in addition to an automatic transmission mode. A patent document 1 discloses a technique of performing an automatic shift at the time of the manual shift mode in such an automatic transmission.

The automatic shift in the manual shift mode as disclosed in the patent document 1 has a following problem. For example, an assumption is that a manual upshift operation is performed manually when a so-called kick down command for a downshift is produced by sharp or immediate depression of the accelerator pedal by the driver. In this case, the downshift command and the upshift command are produced simultaneously. Accordingly, the downshift command and the upshift command are canceled out each other, and the automatic shift is not achieved. In practice, the manual shifting operation in the direction opposite to the automatic shift is likely to be a misoperation of the driver. By failing to perform the automatic shift based on such a misoperation, the control system tends to degrade the operability or drivability as a result.

PRIOR ART LITERATURE

Patent Document(s)

Patent Document 1: JP 7-083327 A

SUMMARY OF THE INVENTION

It is an object of the present invention to provide a control apparatus for an automatic transmission arranged to achieve a shift operation without degrading the operability or drivability.

According to the present invention, a control apparatus responds to an opposite manual operation performed during an automatic shift based on a shift map, in an opposite direction opposite to the automatic shift or to an opposite manual operation performed, during a forced shift performed regardless of the manual operation, in the opposite direction opposite to the forced shift, by forbidding the shift resulting from a first manual operation in the opposite direction opposite to the automatic shift or the forced shift and permitting the shift resulting from a second or subsequent manual operation in the opposite direction opposite to the automatic shift or the forced shift.

Therefore, the control apparatus can perform the shift properly as desired by the driver and improve the operability by nullifying the manual shift based on the first manual shifting operation which is likely to be misoperation. Moreover, since the second or subsequent manual shifting operation is likely to be an actual intention of the driver, the control apparatus can perform the shift as desired by the driver and improve the operability by permitting the manual shift based on the second or subsequent manual shifting operation.

MODE(S) FOR CARRYING OUT THE INVENTION

Figure 1:
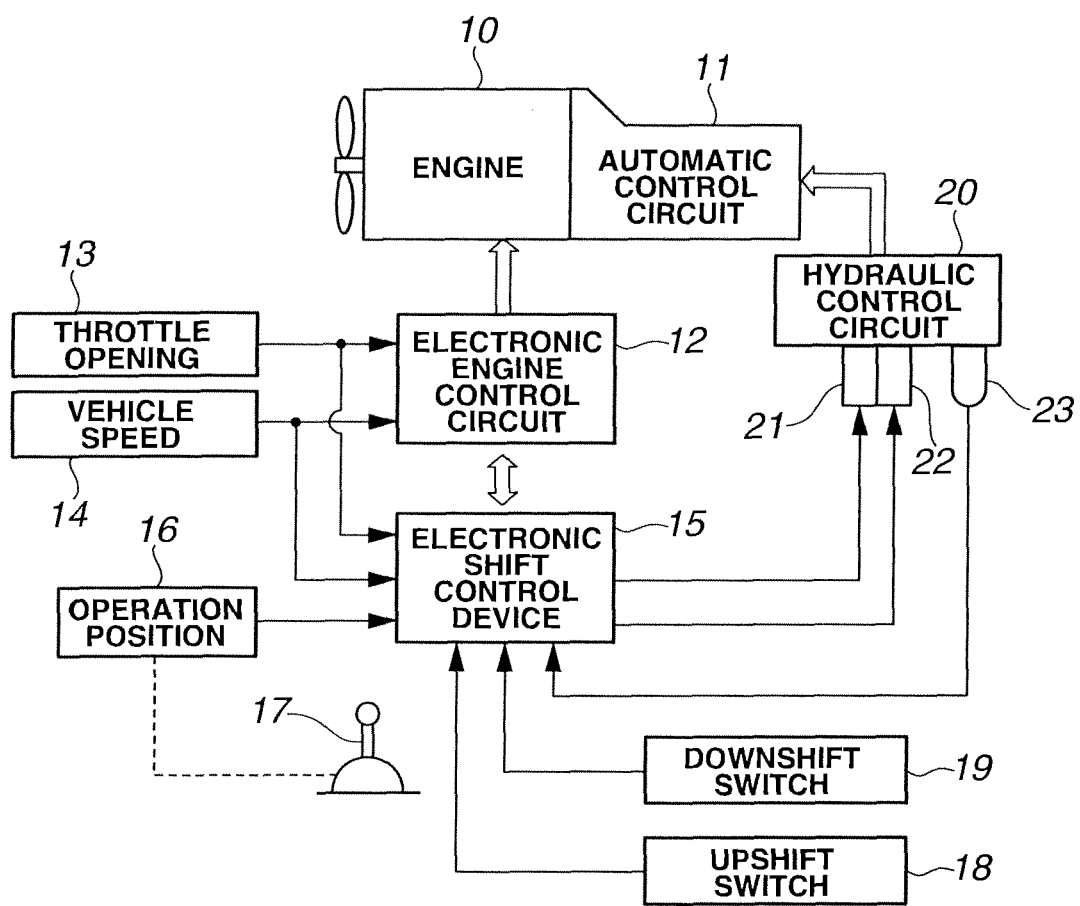
FIG. 1 is a system view showing an outline of a control apparatus or device of an automatic transmission according to an embodiment of the present invention.

FIG. 1 is a system view showing an outline of a control apparatus or device of an automatic transmission according an embodiment. As shown in FIG. 1, an engine 10 and an automatic transmission 11 are controlled by an electronic engine control device or unit 12 and an electronic shift control device or unit 15. Electronic engine control device 12 controls engine 10 in accordance with a throttle opening degree inputted from a throttle opening sensor 13 and a vehicle speed inputted from a vehicle speed sensor 14. Specifically, electronic engine control device 12 controls a fuel injector and an ignition device (not shown) in accordance with a running condition.

Electronic shift control device 15 receives, as inputs, the throttle opening degree inputted from the throttle opening sensor 13, the vehicle speed inputted from the vehicle speed sensor 14, the position of a shift lever 17 sensed by an operation position sensor 16, and upshift/downshift signal or signals inputted form an upshift switch 18 and a downshift switch 19. Shift control device 15 determines a proper speed (that is, a gear position GP) corresponding to the running condition on the basis of a predetermined shift map, and outputs a command to achieve the proper speed, to a hydraulic control circuit 20. The shift map is a map of a known structure having desirable speed regions set in a plane defined by a horizontal axis expressing the vehicle speed and a vertical axis expressing the throttle opening degree, and to set, as a target speed, the speed of speed region to which an operating point determined by the current vehicle speed and the current throttle opening belongs. Accordingly, a detailed explanation is omitted.

The shift control device 15 is configured to output a desired shift speed command, independently of the shift map, in a later-mentioned manual shift mode. When a manual shift command is outputted with the shift switches etc., the shift mode is changed from the automatic shift mode using the shift map to the manual shift mode, and the transmission is shifted to the requested speed.

The hydraulic control circuit 20 supplies a control oil pressure or hydraulic pressure to operate unshown clutch(es) and brake(s) provided in automatic transmission 11. When a control signal to achieve a proper speed is produced by shift control device 15, command signals for each shift control are outputted to solenoids 21 and 22 provided in hydraulic control circuit 20. An oil temperature sensor 23 provided in hydraulic control circuit 20 is arranged to sense temperature of an operating oil and to output the sensed oil temperature to shift control device 15. In the example shown in FIG. 1, the hydraulic control circuit 20 is illustrated to have only two solenoids. However, in practice, the hydraulic control circuit 20 is provided with a plurality of solenoids in a number corresponding to the number of actuators to be operated in the automatic transmission 11.

Figure 2:
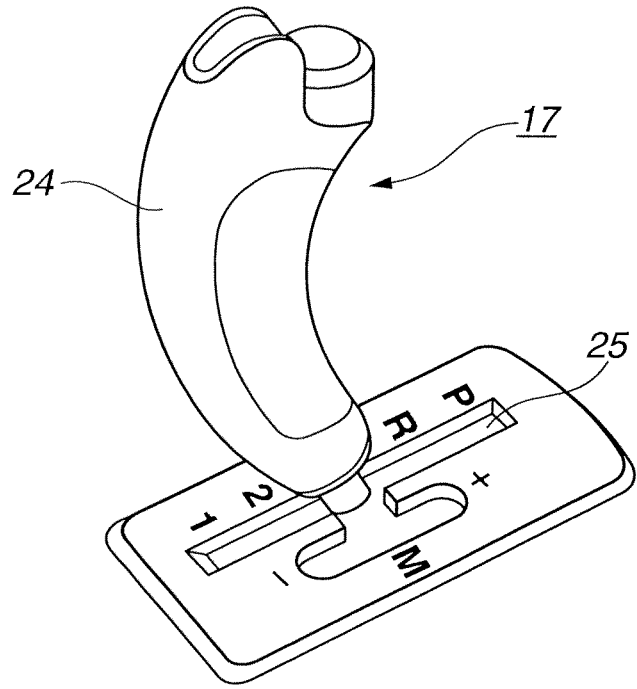
FIG. 2 is a schematic view showing the construction of a shift lever device according to the embodiment.

FIG. 2 is a schematic view showing the construction of a shift lever device in this embodiment. A shift lever device 17 shown in FIG. 2 is constructed to enable operations both in the automatic shift mode for performing automatic upshift and automatic downshift with the automatic transmission and the manual shift mode for performing manual upshift and manual downshift with a driver's manual operation. The shift lever device 17 of FIG. 2 is arranged to enable selection of "P" range, "R" range, "N" range, "D" range "2" range and "1" range, and additionally enable the selection of "M" range (the manual shift mode), with a select lever 24. The "D" range corresponds to the automatic shift mode.

The shift lever device 17 is formed with a guide groove 25 shaped approximately in the form of a letter H, to guide the select lever 24. The position for "M" range is reached by inclining select lever 24 from the side of "D" range rightwards. At the position of "M" range, the shift lever 24 can be inclined forwards and rearwards. Inclination of select lever 24 at "M" range in a forward direction (+ direction) actuates the upshift switch 18 (shown in FIG. 1), and an upshift signal (M+) is delivered to shift control device 15. Inclination of select lever 24 at "M" range in a rearward direction (− direction) actuates the downshift switch 19, and a downshift signal (M−) is delivered to shift control device 15. Shift control device 15 determines a shift of one shift step in accordance with the upshift signal or downshift signal produced in response to a first operation or first action of select lever 24. Specifically, the shift control device 15 judges the shift to be to a (n+1)th speed when the upshift signal is inputted once in the state of the nth speed. Shift control device 15 judges the shift to be to a (n−1)th speed when the downshift signal is inputted once in the state of the nth speed.

In this embodiment, it is possible to employ an arrangement in which a shift switch is provided in the steering wheel and arranged to have an upper portion of the shift switch to be pressed to command upshift, and a lower portion to be pressed to command downshift. Instead of providing the shift switch in the steering wheel, it is possible to employ an arrangement in which a lever type shift switch is provided in a steering column, and arranged to actuate an upshift switch by lifting the lever upwards and actuate a downshift switch by pushing the lever downwards. In these arrangements, the upshift signal and the downshift signal may be produced without selection of the "M" range, and therefore, the manual shift command may be received during the automatic shift. In this case, the control system basically gives priority to the shifting operation performed manually, changes the shift mode from the automatic shift mode to the manual shift mode, and performs the upshift or downshift.

When the automatic shift mode is selected, the control apparatus of the automatic transmission according to this embodiment selects the desirable speed in accordance with the running state of the vehicle on the basis of the shift map, and outputs the shift command toward this desirable speed. When the manual shift mode is selected, the control apparatus performs the shift based on the manual operation basically, and performs a forced shift or forcible shift to shift the gear position forcibly depending on the situation. Following is explanation on the forced shift.

Figure 3:
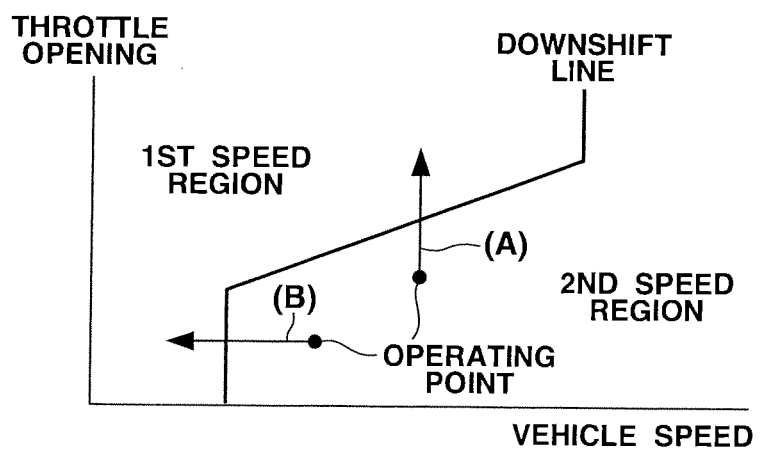
FIG. 3 is a shift diagram or variogram showing a forced shift map according to the embodiment.

A forced upshift or forcible upshift is performed as follows. When the engine speed reaches a region near the limit speed (an over revolution state), the control system performs the upshift forcibly without regard to the driver's operation, to decrease the engine speed for protection of the engine. A forced downshift or forcible downshift is performed as follows. FIG. 3 is a shift diagram showing a forced shift map in this embodiment. When, for example, the manual shift mode is selected, and currently the second speed is selected, the operating point is set, by the current vehicle speed and the current throttle opening, in the forced shift map including a forced downshift line. If, in this state, the accelerator pedal is depressed largely by the driver, the control system performs the forced downshift to the first speed, regardless of the manual shift mode, because of transition of the operating point, as shown by an arrow (A) in FIG. 3, across the forced downshift line, from the second speed region to the first speed region. This control is a control called a kick-down, and employed even in the manual shift mode. With this control, the control system achieves the vehicle driving dynamic performance corresponding to the driver's accelerator pedal operation.

Moreover, when the vehicle speed decreases to such a level that the engine might fall into engine stall, the operating point crosses the forced downshift line and moves from the second speed region to the first speed region as shown by an arrow (B) in FIG. 3, so that the forced downshift to the first speed is carried out. The forced downshift line is set for each of the speeds. The control system is arranged to select a map in dependence on the speed selected in the manual shift mode, and carries out the control based on the selected map.

As mentioned before, when, during the automatic shift or the forced shift (these shifts based on commands other than the manual operation are collectively referred to as "nonintentional shift"), an upshift signal or a downshift signal is produced on the basis of the driver's manual operation, in the opposite direction opposite to the nonintentional shift, the control to respond to the signal is problematical as explained below. The automatic shift is carried out in conformity with the requirement such as the improvement of the fuel consumption and the achievement of the dynamic performance, and the forced shift is carried out in conformity with the requirement such as protection of the engine, prevention of the engine stall and securement of the dynamic performance. If, in this case, the signal is produced by the manual operation in the direction opposite to the nonintentional shift, the nonintentional shift is canceled and the control system is unable to satisfy the above-mentioned requirements.

If the manual shift command is reliable as the driver's intention, the manual shift command is not so problematical (or not problematical at all if the manual shift command reflects the driver's intention correctly). However, detailed investigation of actual driving situations has revealed that the manual shift signal is produced by a misoperation of the driver in many cases. Moreover, it is found that, in the case of a driver's intentional manual operation, the driver tends to try the shift by performing the manual operation again when the shift is canceled by the first manual operation.

The driver controls the driving force of the vehicle basically with the accelerator operation. Therefore, when the driver's intention with the accelerator operation, specifically in the case of kick down shift is compared with the upshift by the manual operation, the manual operation is more likely to be a misoperation.

In this embodiment, therefore, the control apparatus is arranged to employ an operational error preventing control to cancel (forbids, that is) a shift based on a first manual operation when a shift command is produced, during the nonintentional shift, in an opposite direction opposite to the nonintentional shift, and to permit a shift based on a second or subsequent manual operation. In this embodiment, the operational error preventing control is performed when a manual upshift command is produced by a manual operation during an nonintentional downshift.

In this embodiment, the control apparatus permits, from a first manual operation, a shift based on a manual operation (a downshift command due to the manual operation) in the opposite direction to the nonintentional upshift during the nonintentional upshift because the manual operation in the opposite direction is not necessarily a misoperation of the driver. For example, in the case of the nonintentional upshift caused by a rapid release of the foot from the accelerator pedal, it is appropriate to consider that the driver desires the decelerations and hence releases the accelerator pedal. In this case, the driver may produce a downshift request by performing a manual operation to avoid the upshift in order to obtain further engine braking force.

[Operational Error Preventing Control Process]

Figure 4:
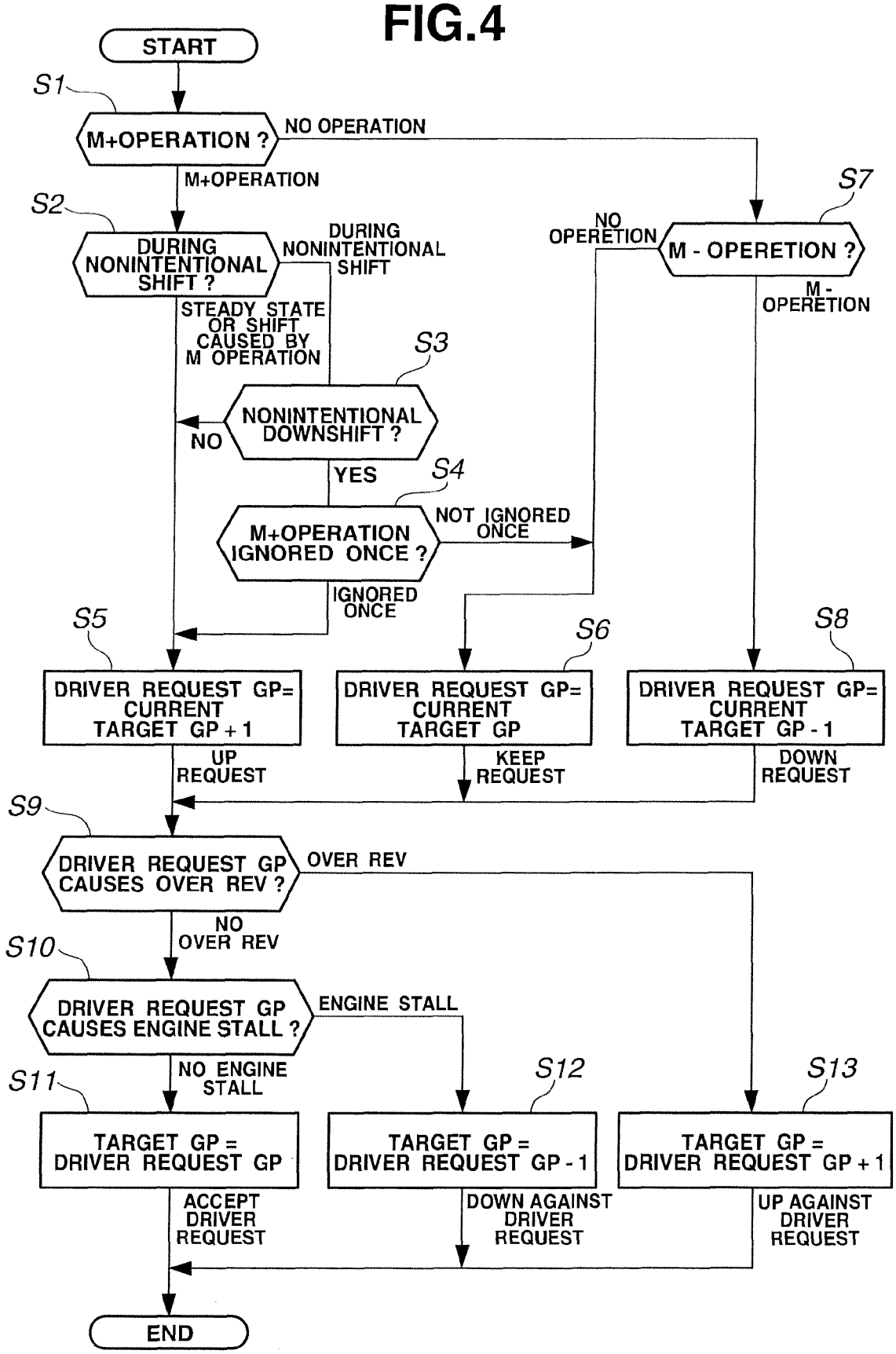
FIG. 4 is a flowchart showing an operational error preventing control process according to the embodiment.

FIG. 4 is a flowchart showing an operational error preventing control process according to this embodiment. This flowchart shows a process to determine whether to perform a manual shift due to a manual operation when a shift signal is produced by the manual shift with the shift switches etc., during either of the automatic shift mode and the manual shift mode At a step S1, the control system determines whether there is an upshift request due to a manual operation (M+ operation). From S1, the control system proceeds to a step S2 in the case of existence of the upshift request, and proceeds to a step S7 in the case of nonexistence of the upshift request.

At step S2, the control system determines whether the nonintentional shift is in progress or not. From S2, the control system proceeds to a step S3 in the case of judgment that the nonintentional shift is in progress, and proceeds to a step S5 in the case of judgment that the current state is a steady state which is a state of no shift, or a state in which a shift in the manual shift mode is in progress.

At step S3, the control system determines whether the nonintentional shift is a downshift or not. From S3, the control system proceeds to step S5 because the shift direction of the nonintentional shift and the shift direction of the manual shift caused by the manual operation are the same as each other when the nonintentional shift is the nonintentional upshift. When, on the other hand, the nonintentional shift is a downshift, the control system proceeds from S3 to a step S4 because the shift direction of the nonintentional shift and the shift direction of the manual shift caused by the manual operation are opposite to each other.

At step S4, the control system determines whether the upshift due to the manual operation has been ignored once or not. From S4, the control system proceeds to step S5 when the upshift due to the manual operation has been ignored once. When the upshift due to the manual operation has not been ignored once, the control system proceeds from S4 to a step S6, and ignores the upshift command. The control system examines whether the upshift due to the manual operation has been ignored once or not, by checking an on/off state of a later-mentioned once-ignored flag.

At step S5, the control system sets the driver's request shift speed at the value of (the current target speed +1), and then proceeds to a step S9. Thus, the control system outputs an upshift request.

At step S6, the control system holds the driver's request shift speed unchanged at the value of (the current target speed), and then proceeds to step S9. Thus, the control system outputs a keep request to keep the speed.

At step S7, the control system determines whether there is a downshift request (M− operation) caused by the manual operation. From S7, the control system proceeds to a step S8 in the case of existence of the downshift request, and proceeds to step S6 in the case of nonexistence of the downshift request since there is no manual operation at all.

At step S8, the control system sets the driver's request shift speed at the value of (the current target speed −1), and then proceeds to step S9. Thus, the control system outputs a downshift request.

At step S9, the control system determines whether the driver's request speed causes an engine overspeed (that is, over revolution). From S9, the control system proceeds to a step S13 when it is judged that the over revolution will be caused, and to a step S10 when it is judged that the over revolution will not be caused.

At step S10, the control system determines whether the driver's request speed causes an engine stall. From S10, the control system proceeds to a step S12 when it is judged that the engine stall will be caused, and to a step S11 when it is judged that the engine stall will not be caused.

At step S11, the control system sets the next target speed in line with the driver's request speed. Thus, the control system accepts the driver' request.

At step S12, the control system sets the next target speed at the value of (the driver's request speed −1). Thus, the control system prevents engine stall by setting the target speed at the speed level downshifted by one step from the driver' request speed.

At step S13, the control system sets the next target speed at the value of (the driver's request speed +1). Thus, the control system prevents over revolution by setting the target speed at the speed level upshifted by one step from the driver' request speed.

Figure 5:
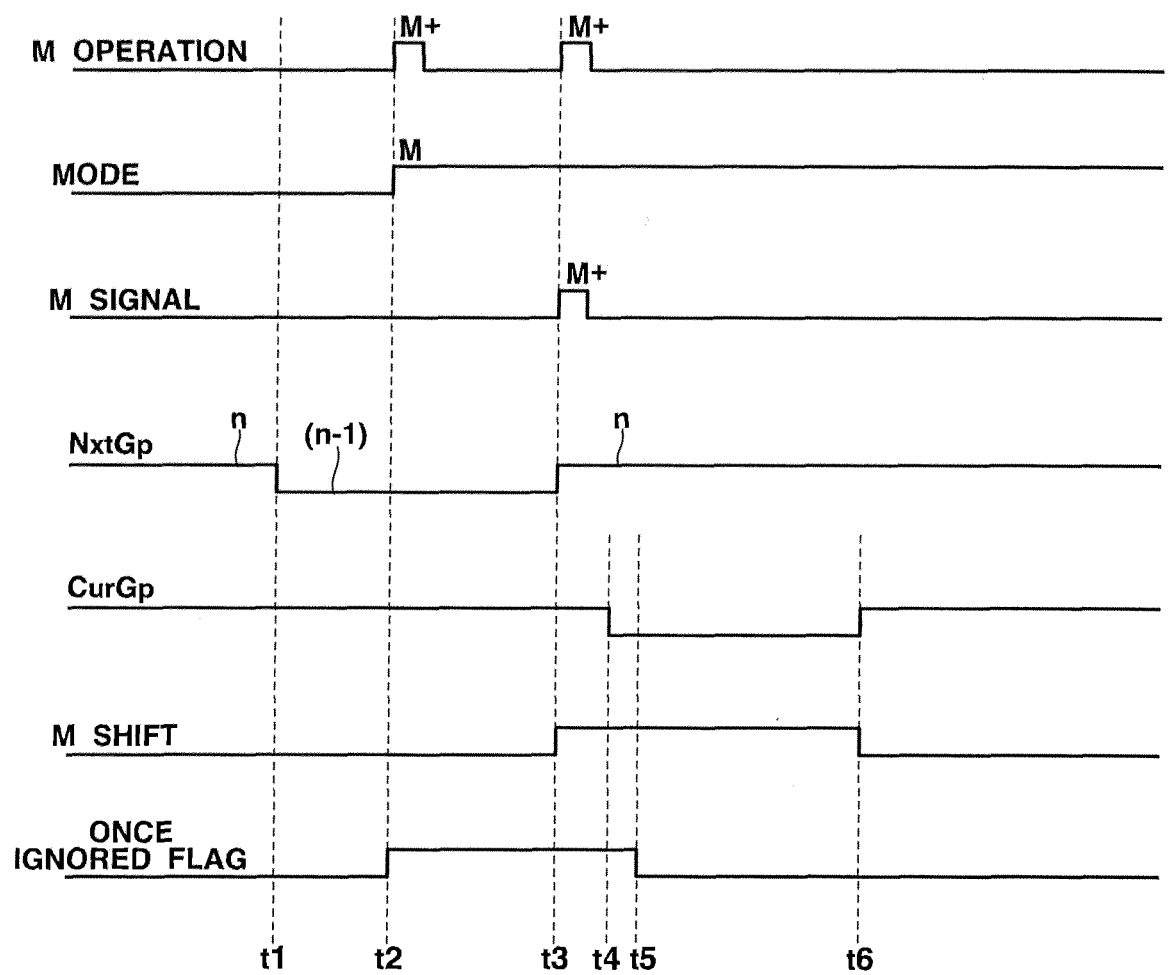
FIG. 5 is s a time chart showing the operational error preventing control process according to the embodiment.

The above-mentioned control flow brings about following operations. FIG. 5 is a time chart illustrating the operational error preventing control process according to the embodiment. FIG. 5 shows the state in which, when, as the initial condition, the automatic shift mode is selected, and the nth speed is selected, the automatic downshift control to the (n−1)th speed is performed automatically in response to crossing across the downshift line. In the case in which the forced downshift control performed during the selection of the manual shift mode, operations are basically the same.

In FIG. 5, "NxtGP" stands for the target speed set by electronic shift control device 15. "CurGP" stands for the actual speed. "M+ operation" stands for the state to turn on the upshift switch 18. "Mode" represents the selection state of selection between the automatic shift mode and the manual shift mode. "M signal" stands for the on signal of upshift switch 18 actually accepted. "M shift" stands for the state in which the shift request is produced on the basis of the M signal. "Once ignored flag" stands for a flag which is set on when a first action of "M+ operation" during the nonintentional shift is ignored, and which is cleared when the nonintentional shift is finished.

At an instant t1, the operating point crosses the downshift line because of a decrease of the vehicle speed, the target speed is set at the (n−1)th speed, and the downshift control is performed from the nth speed to the (n−1)th speed. The same applies to the downshift caused by kickdown instead of the decrease of the vehicle speed.

At an instant t2 during the execution of the downshift control, a manual upshift operation, that is "M+ operation", is carried out by the driver, and the shift mode is changed from the automatic shift mode to the manual shift mode. However, in this case, the downshift control in the automatic shift mode is in progress. Therefore, a first action of "M+ operation" is ignored or disregarded, and the once ignored flag is set on or turned on. By so doing, the control system can nullify or override the first opposite manual operation which is high in possibility of operational error, and perform the shift properly as really desired by the driver. Therefore, the control system can improve the driveability or operability.

At an instant t3, a second action of "M+ operation" is performed during the downshift control started at the time of the automatic shift mode, and this manual operation is accepted. Therefore, "M+" is outputted as the M signal, the target speed is changed from the (n−1)th speed to the nth speed, the "M shift" is turned on and the shift request due to the manual shift is outputted. However, since the downshift control started at the time of the automatic shift mode is not yet finished, the control system waits in a standby state until the end of this control. Since the second or subsequent manual operation is likely to be an actual intention of the driver, the control system permits the shift caused by the second or subsequent manual operation, thereby performs the shift as desired by the driver, and improves the drivearbility or operability.

At a instant t4, the downshift control started at the time of the automatic shift mode is finished, and hence the actual speed) is brought to the (n−1)th speed. In this case, the "M shift" is on and the target speed is the nth speed. Therefore, the upshift control is started.

At an instant t5, the once-ignored flag is cleared because of the end of the downshift control.

At an instant t6, the upshift control based on the M signal is finished and hence the actual speed) is brought to the nth speed. Therefore, the target speed) and the actual speed) become equal to each other, the "M shift" is turned off and the shift control is finished.

As explained above, this embodiment has following advantages.

The electronic shift control device 15 according to the embodiment performs an operational error preventing control process in a following manner using an automatic shift mode based on a preset shift map and a manual shift mode based on a driver's manual operation. When, during an automatic shift based on the shift map in the case of selection of the automatic shift mode or during a forced shift performed without regard to a manual operation in the case of selection of the manual shift mode, an opposite manual shift operation is performed in a direction opposite to the automatic shift or the forced shift, then the electronic shift control device 15 forbids a shift based on a first opposite manual operation as shown by a route of step S4→step S6, and permits a shift based on a second or subsequent opposite manual operation as shown by a route of step S4→step S5.

With this operational error preventing control process, the control apparatus or control system can perform the shift of the transmission properly as really desired by the driver, and improve the driveability or operability, by nullifying the shift resulting from the first manual operation which is likely to be operational error or misoperation. Furthermore, since the second or subsequent manual operation is likely to be an actual intention of the driver, the control system permits the shift caused by the second or subsequent manual operation, thereby performs the shift as desired by the driver, and improves the drivearbility or operability.

Moreover, when a manual upshift operation is performed during a downshift process of the automatic shift or the forced shift, the control device 15 performs the functional error preventing control process in a following manner.

When the nonintentional upshift is performed because of a quick release of the foot from the accelerator pedal, it is appropriate to assume that the driver has released the accelerator pedal in hope of a deceleration. In this case, the driver may produce a downshift request with a manual operation to avoid the upshift to obtain an engine braking force. Therefore, the control system performs the operational error preventing control when the upshift command is produced by the manual operation during the nonintentional downshift. By so doing, the control system can perform the shift properly as desired by the driver, and thereby improve the driveability.

In the explanation of the embodiment, the upshift command is produced by the manual operation during the nonintentional downshift. However, the control system may be arranged so that, when the downshift command is produced by the manual operation during the nonintentional upshift, the shift based on the first manual operation is canceled (forbidden), and the shift based on the second or subsequent manual operation is permitted.

Although the invention has been described above with reference to the embodiment of the invention, the invention is not limited to the construction described above. It is possible to employ other constructions.

The forced shift and the automatic shift of the embodiment may be a one-step shift such as a shift from the second speed to the third speed, or may be a jump shift such as a shift from the second speed to the fourth speed.

Although the embodiment is applied to the step automatic transmission, the transmission may be a continuously-variable transmission which is equipped with the manual shift mode.

Although, in the embodiment, the control is directed to all types of the nonintentional shift, the control system of the invention may be so arranged that the operational error preventing control process is performed only during a kick-down. However, in the case in which there is a possibility of engine stall even if an upshift command due to a manual operation during the downshift due to the kick down is accepted, the control system forbids the upshift, needless to say.

In the embodiment, the operational error preventing control process is performed when the manual upshift operation (M+ operation) is performed during the nonintentional downshift.

However, in order to simplify the control, it is possible to employ the arrangement in which the operational error preventing control process is performed also when the manual upshift operation (M+ operation) is performed during the nonintentional upshift. That is, the control system in this case performs the operational error preventing control process when the manual upshift operation (M+ operation) is performed during the nonintentional shift (regardless whether the upshift or the downshift).

The invention claimed is:

1. A control apparatus for an automatic transmission provided with an automatic shift mode to perform an automatic shift based on a predetermined shift map and a manual shift mode to perform a shift based on a manual operation of a driver, the control apparatus being configured so that, when an opposite manual operation is performed, during the automatic shift based on the shift map in the automatic shift mode, in an opposite direction opposite to the automatic shift or when the opposite manual operation is performed, during a forced shift performed regardless of the manual operation in the manual shift mode, in the opposite direction opposite to the forced shift, the control apparatus forbids a shift based on a first manual operation in the opposite direction opposite to the automatic shift or the forced shift and permits a shift based on a second or subsequent manual operation in the opposite direction opposite to the automatic shift or the forced shift.

2. The control apparatus for the automatic transmission as recited in claim 1, wherein, when the automatic shift or the forced shift is a downshift, and a shift request produced by the manual operation is an upshift, the control apparatus forbids the shift based on the first manual operation and permits the shift based on the second or subsequent manual operation.

3. The control apparatus for the automatic transmission as recited in claim 1, comprising a controller configured to respond to the opposite manual operation performed during the automatic shift based on the shift map, in the opposite direction opposite to the automatic shift, by forbidding the shift resulting from the first manual operation in the opposite direction opposite to the automatic shift and permitting the shift resulting from the second or subsequent manual operation in the opposite direction opposite to the automatic shift.

4. The control apparatus for the automatic transmission as recited in claim 1, comprising a controller configured to perform a first control to forbid the shift based on the first manual operation in the opposite direction when the opposite manual operation is a manual upshift operation, and to perform a second control to permit the shift based on the first manual operation in the opposite direction when the opposite manual operation is a manual downshift operation.

5. A control apparatus for an automatic transmission provided with an automatic shift mode to perform a shift based on a predetermined shift map and a manual shift mode to perform a shift based on a manual operation of a driver,
the control apparatus being configured so that, when an opposite manual upshift operation is performed, during an automatic downshift based on the shift map in the automatic shift mode, in an opposite direction opposite to the automatic downshift or when the opposite manual upshift operation is performed, during a forced downshift performed regardless of the manual operation in the manual shift mode, in the opposite direction opposite to the forced shift, the control apparatus forbids an upshift based on a first manual upshift operation and permits an upshift based on a second or subsequent manual upshift operation.

6. The control apparatus for the automatic transmission as recited in claim 5, wherein the control apparatus is configured so that, when an opposite manual downshift operation is performed, during an automatic upshift based on the shift map in the automatic shift mode, in the opposite direction opposite to the automatic upshift or when the opposite manual downshift operation is performed, during a forced upshift performed regardless of the manual operation in the manual shift mode, in the opposite direction opposite to the forced upshift, the control apparatus permits a downshift based on a first manual downshift operation.

* * * * *